United States Patent [19]

Dembrosky et al.

[11] Patent Number: 5,563,758

[45] Date of Patent: Oct. 8, 1996

[54] CIRCUIT TO PERMIT THREE PHASE INPUT POWER SUPPLY TO OPERATE WHEN ONE PHASE DROPS OUT AND PROVIDE LIGHTENING PROTECTION

[75] Inventors: Edward D. Dembrosky, Owego; Mark K. DeMoor, Apalachin, both of N.Y.; Randhir S. Malik, Colchester, Vt.

[73] Assignee: International Business Machines Corporation, Armonk, N.Y.

[21] Appl. No.: 412,818

[22] Filed: Mar. 29, 1995

Related U.S. Application Data

[63] Continuation-in-part of Ser. No. 200,054, Feb. 22, 1994.

[51] Int. Cl.$^6$ .................................................... H02H 7/10
[52] U.S. Cl. ................ 361/56; 361/91; 361/111; 361/18; 363/52
[58] Field of Search ................ 361/18, 76, 85, 361/92, 56, 86, 111; 363/51–54; 307/66, 67, 64

[56] References Cited

U.S. PATENT DOCUMENTS

| | | | |
|---|---|---|---|
| 4,331,994 | 5/1982 | Wirth | 361/56 |
| 4,802,053 | 1/1989 | Wojtak et al. | |
| 4,811,190 | 3/1989 | Keir et al. | |
| 4,816,982 | 3/1989 | Severinsky | |
| 4,821,166 | 4/1989 | Albach | |
| 4,843,533 | 6/1989 | Roof et al. | 361/111 |
| 4,933,803 | 6/1990 | Kalivas | |
| 5,115,185 | 5/1992 | Fraidlin et al. | |

Primary Examiner—Todd Deboer
Attorney, Agent, or Firm—Arthur J. Samodovitz

[57] ABSTRACT

A power supply circuit receives and rectifies a three phase power source. A first capacitor is coupled to filter and store the rectified three phases and supply the stored energy to a DC/DC converter. The first capacitor is large enough, when all three phases are present, to filter the rectified input power and supply rated voltage to the DC/DC converter between peaks in the phases, but not too large as to adversely affect the power factor. However, when one phase drops out, additional capacitance is required to maintain rated voltage to the DC/DC converter during the periodic absence of the one phase. Thus, a switch and a second capacitor are connected in series with each other and in parallel with the first capacitor. In response to absence of one of the phases, the switch is activated to couple the second capacitor to filter and store the rectified two phases and supply the stored energy to the DC/DC converter. The additional capacitance of the second capacitor is sufficient to maintain rated voltage to the DC/DC converter during the absence of the one phase.

19 Claims, 6 Drawing Sheets

CIRCUIT TO PERMIT THREE PHASE INPUT POWER SUPPLY TO OPERATE WHEN ONE PHASE DROPS OUT AND PROVIDE LIGHTENING PROTECTION

This is a continuation-in-part of U.S. patent application entitled "AC Line Stabilization Circuitry For High Power Factor Loads" Ser. No. 08/200,054 filed by William Hemena and Randhir S. Malik on Feb. 22, 1994.

BACKGROUND OF THE INVENTION

The invention relates generally to power supplies and deals more particularly with a circuit which permits a three phase input power supply to operate when one phase drops out, and also provides protection from lightning.

Many types of DC power supplies operate from a three phase power source. Occasionally, one phase drops out. It was known in the prior art to detect when one phase drops out, and in response, shut off the power supply altogether. This solution is not acceptable for critical loads that cannot afford a shut down.

Power supplies also need protection from lightning surges which may dramatically increase the line voltage. It was known to use a zener diode or switch to limit the voltage applied to the power supply input from the line. Capacitance at the input to the power supply is also effective in shunting short surges; however the capacitance reduces the power factor of the power supply during normal operation. A very low power factor may be objectionable to the power company and require heavier gauge wiring at the site where the power supply is being used.

Accordingly, a general object of the present invention is to provide a circuit which permits a three phase input power supply to operate when one phase drops out.

Another general object of the present invention is to provide such a circuit which also protects the power supply against lightning surges on the power line.

Another object of the present invention is to provide circuits of the foregoing types with high power factor during normal operation.

SUMMARY OF THE INVENTION

The invention resides in a circuit for supplying plural phase rectified voltage to a DC/DC power converter. The circuit has three input ports to receive three phases of an AC power source and three rectifiers coupled to the three input ports, respectively to rectify the three phases. The DC/DC converter is coupled to receive power from the rectified three phases. A first capacitor is coupled to filter and store the rectified three phases and supply the stored energy to the DC/DC converter. The first capacitor is large enough, when all three phases are present, to filter the rectified input power and supply rated voltage to the DC/DC converter between peaks in the phases, but not too large as to adversely affect the power factor. However, when one phase drops out, additional capacitance is required to maintain rated voltage to the DC/DC converter during the periodic absence of the one phase. Thus, a switch and a second capacitor are connected in series with each other and in parallel with the first capacitor. In response to absence of one of the phases, the switch is activated to couple the second capacitor to filter and store the rectified two phases and supply the stored energy to the DC/DC converter. The additional capacitance of the second capacitor is sufficient to maintain rated voltage to the DC/DC converter during the absence of the one phase.

BRIEF DESCRIPTION OF THE FIGURES

FIGS. 1(a–d) illustrate an AC/DC converter comprising a DC/DC converter according to the prior art and an input rectifying and filtering circuit according to the present invention.

DETAILED DESCRIPTION OF THE PREFERRED EMBODIMENTS

Referring now to the figures in detail, FIGS. 1(a–d) illustrate a three phase input AC/DC power converter generally designated 8. AC/DC converter 8 comprises a known DC/DC converter 10 and a rectifying and filtering circuit generally designated 20, according to the present invention. Circuit 20 is interposed between the DC/DC converter 10 and a three phase power source 22. In addition to standard rectification and filtering, circuit 20 includes extra circuitry according to the present invention to permit the DC/DC section to continue to operate when one phase drops out. The extra circuitry also provides lightning protection. By way of example, the DC/DC section 10 is a pulse width modulated converter; however, the nature of the DC/DC section is not critical to the present invention.

During normal operation, all three phases A, B and C of power source 22 are present and provide rated voltage. All three phases A, B and C are rectified by diodes 30,31, 32,33 and 34,35 respectively, combined at the anodes of the diodes 30, 32 and 34 and then filtered by capacitor 40 to provide a substantially DC voltage. By way of example, each of the three phases provides approximately 300 volts peak with a frequency of sixty hertz, and capacitor 40 is 2.2 microfarads. The "bulk" voltage (Vbulk) developed across capacitor 40 has a 360 Hz ripple due to the three phase rectification. The small size of capacitor 40 yields a large power factor, but too little storage capacity to supply DC/DC converter 10 during the whole cycle if one of the phases drops out.

All three phases of power source 22 are also rectified by diodes 44, 46 and 48 and combined at the anodes of these diodes. Then the rectified combination is passed through a voltage divider 50 to a three phase detector subcircuit 54 to determine if all three phases are present. At subcircuit 54, the divided signal is applied to the noninverting input of a comparator 56 (with noise filtering by capacitors 52 and 58). The inverting input is supplied with a reference voltage from the anode of a zener diode 64. When all three phases are present, the voltage at the noninverting input of comparator 56 always exceeds the reference voltage and the comparator continuously outputs a high level. The output of comparator 56 is supplied to the input of a one-shot 70. Thus, when all three phases are present, comparator 56 continuously outputs a high level and the one-shot, being edge triggered, is inactive, outputting a continuously low voltage. The low voltage output by one-shot 70 keeps the noninverting input of a comparator 76 low and consequently the comparator 76 outputs a low level. The low level output of comparator 76 keeps a transistor 78 off. (Transistor 79 is oppositely controlled and is activated by the same low level from comparator 76 to shunt any leakage current from transistor 78 and speed the switching time of transistor 78.)

With transistor 78 off, no current flows from a twelve volt source to the control of an SCR 90, and SCR 90 remains off. A capacitor 92, for example 1500 microfarads, is arranged in series with the SCR 90. By keeping the SCR 90 off, capacitor 92 does not participate significantly in the filtering or phase shifting of the bulk voltage for the DC/DC converter. This is because of a relatively large resistance (due to resistor 95) in series with capacitor 92 and is desirable when all three phases are present to maintain the high power factor. Nevertheless, capacitor 92 will be fully charged via resistor 95 to the bulk voltage when all three phases are present. As described in more detail below, this charge will be used when one phase drops out.

If one of the phases drops out, the noninverting input to comparator 56 will fall below the reference voltage for a portion (corresponding to the absent phase) of each sixty hertz cycle. Consequently, comparator 56 will output a 60 hertz pulse train and periodically trigger re-triggerable one-shot 70 to keep the output of one-shot 70 continuously high. (By way of example, the pulse width of the one-shot is twenty milliseconds.) The continuously high output of one-shot 70 will cause comparator 76 to output a high level. Comparator 76 then activates transistor 78 (assuming no other control described below simultaneously deactivates transistor 78) which in turn activates SCR 90. With SCR 90 active, capacitor 92 is now connected in parallel with capacitor 40 and fully assists in filtering and storing the input power from the two remaining phases. Under rated load, this extra capacitor 92 maintains rated DC bulk voltage to the DC/DC converter 10 during the full cycle, even during the interval when the one, failed phase is absent. This satisfies one object of the present invention. The only penalty is decreased power factor due to the extra phase shifting caused by the increased capacitance, but this penalty is less severe than a failure of DC/DC converter 10 or a total shut off of the DC/DC converter as in the prior art. Also, the penalty is removed when the failed phase returns.

If all three of the phases drop out, then the output of comparator 56 will drop and trigger one-shot 70 once. The resultant high output of one-shot 70 will cause comparator 76 to output a twenty millisecond high level pulse which activates transistor 78 (assuming no other control described below simultaneously deactivates transistor 78). Transistor 78 then activates SCR 90 to connect capacitor 92 in parallel with capacitor 40 and thereby supply the requisite bulk voltage to the DC/DC converter for twenty milliseconds. To satisfy this storage requirement, capacitor 92 may be 1500 microfarads. Often during this twenty millisecond period, the three phases will return to resume normal operation. Thus, the same circuitry used to supply rated bulk voltage to the DC/DC converter during outage of a single phase for an extended period of time is also used to supply rated bulk voltage to the DC/DC converter during outage of all three phases for a limited time (for example, 20 milliseconds).

Circuit 20 also includes a subcircuit 120 to prevent the SCR 90 from ever passing excessive current. For example, upon power-on, capacitor 92 is discharged so that the full bulk voltage is developed across resistor 95 and applied to the anode of SCR 90. As long as the SCR 90 is off, this will not endanger the SCR 90. After power-on, capacitor 92 will begin to charge and reduce the voltage at the anode of SCR 90 to a safe level if SCR 90 is later activated. There are other conditions when the voltage at the anode of SCR 90 is too great to safely activate SCR 90. Subcircuit 120 ensures that SCR 90 will be off at start-up and these other dangerous times to prevent excessive current from passing through SCR 90. Subcircuit 120 comprises a comparator 124 whose noninverting input is supplied with a reference voltage and whose inverting input is supplied with the SCR 90 anode voltage limited by a ten volt zener diode 130. The output of comparator 124 is also connected to the control of transistor 78. Thus, until the anode voltage falls below the reference voltage, comparator 124 outputs a low level which keeps transistor 78 and SCR 90 off.

Circuit 20 also includes a subcircuit 140 to protect against lightning surges on the three phase power lines which appear as the bulk voltage. The bulk voltage is sensed via a voltage divider 150, and the divided voltage is applied to the noninverting input of a comparator 154. The inverting input is supplied by a reference voltage. If the bulk voltage exceeds 400 volts, then the comparator 154 output a positive pulse which is applied via a diode 156 to the noninverting input of comparator 76. Comparator 76 then activates transistor 78 and SCR 90, and thereby connects capacitor 92 in parallel with capacitor 40. The large capacity of capacitor 92 helps to filter and absorb the lightning surge in accordance with an object of the present invention. If the lightning or other surge appears at a time such that the output voltage has not reached the regulation limits, comparator 300 outputs a low voltage which is "ORed" with the output of comparator 154. Therefore, SCR 90 will not be turned on. This will prevent the inrush current being drawn from the line if the large capacitor 92 would have been connected across the line at the time when the DC/DC converter was just switched on and the lightning or other surge appeared.

Figure 1A:
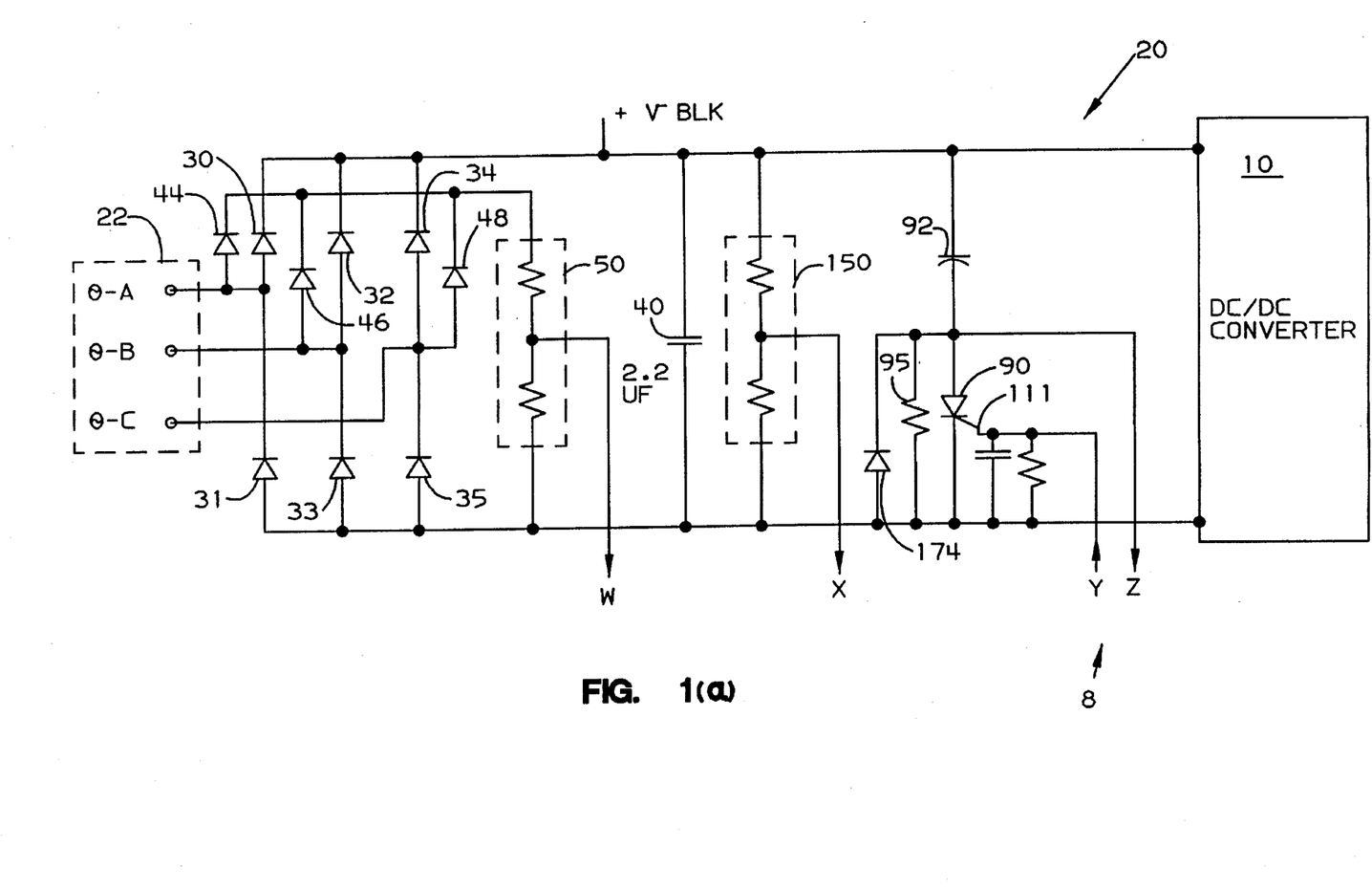
Figure 1B:
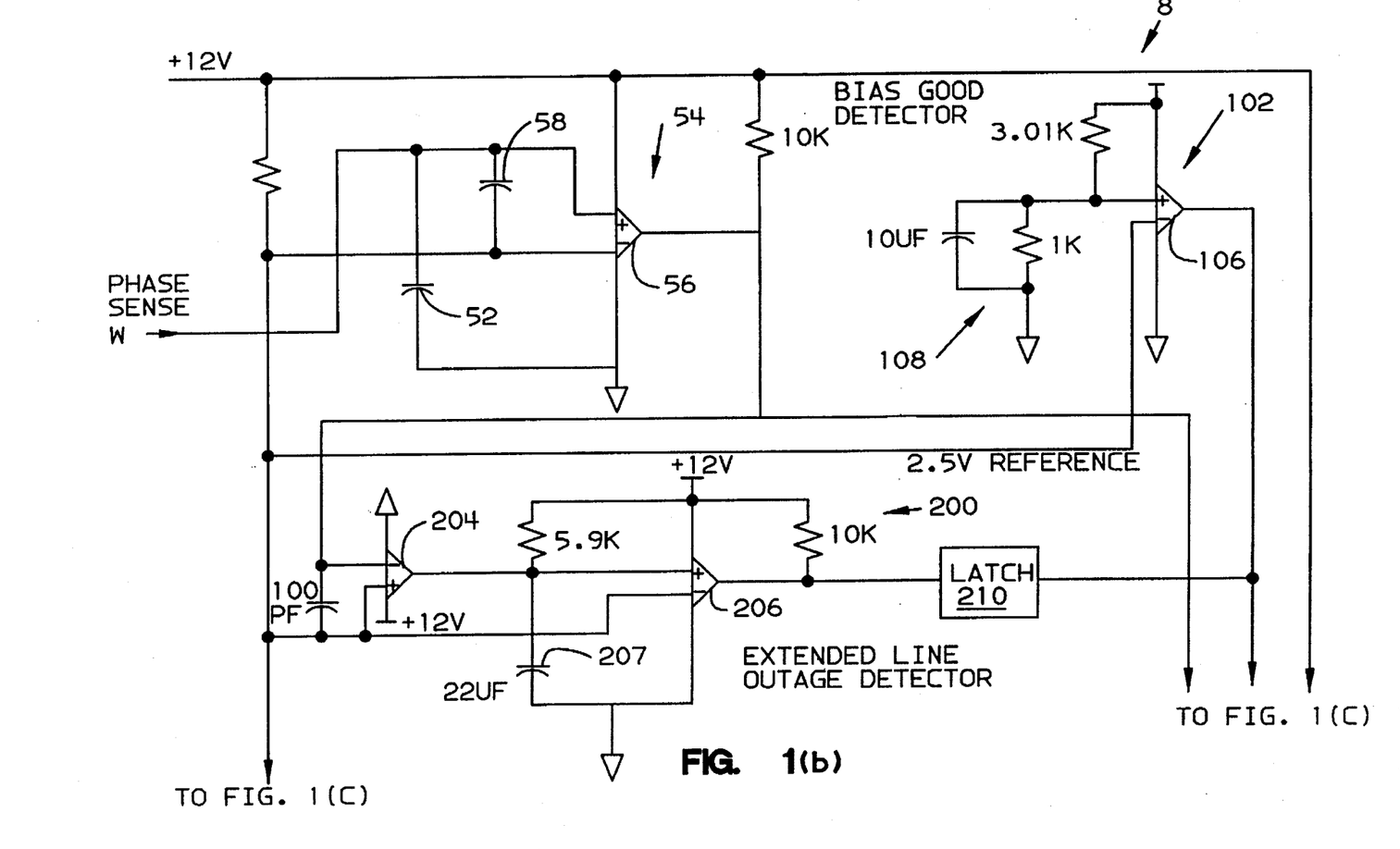
Figure 1C:
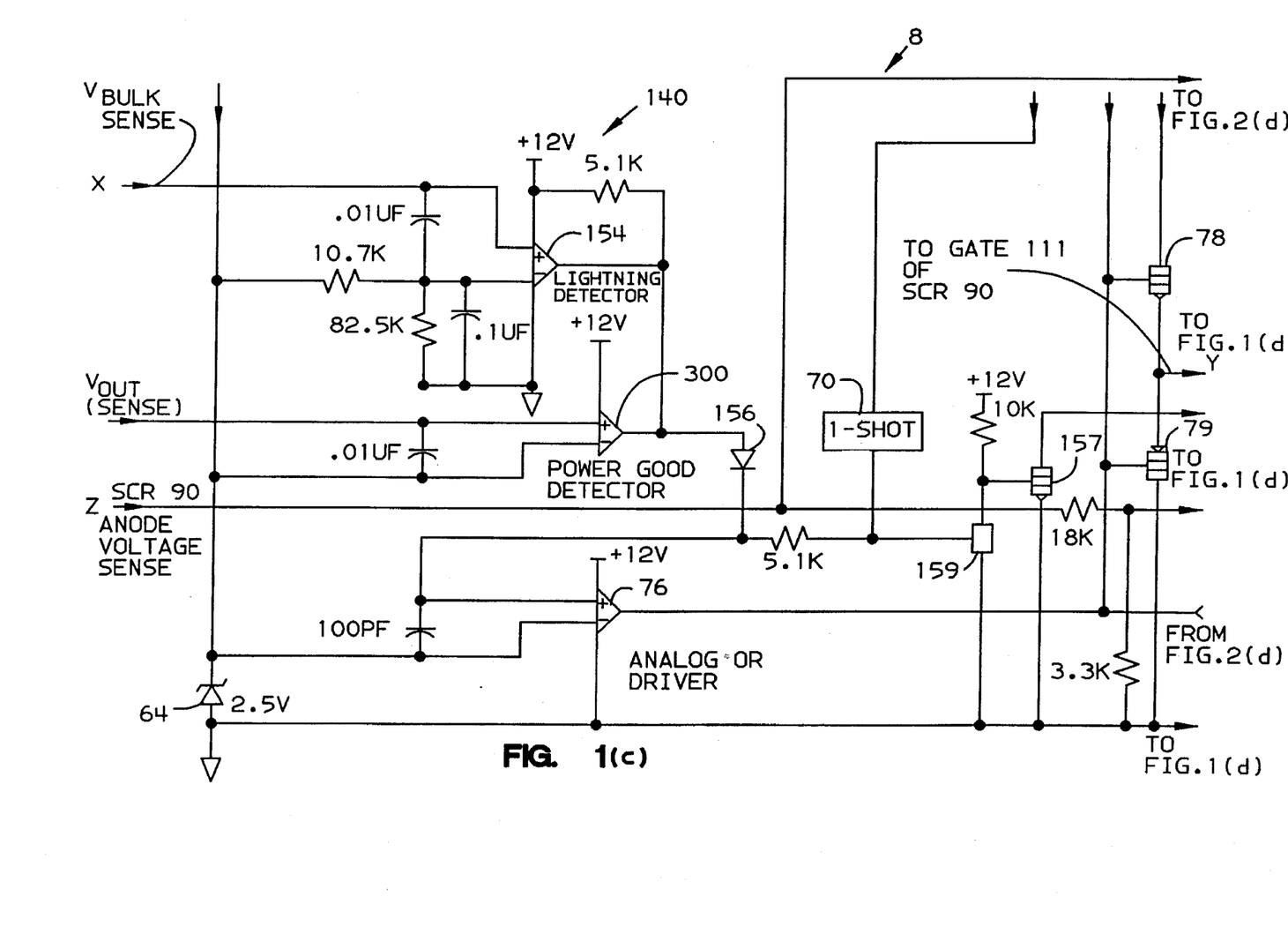
Figure 1D:
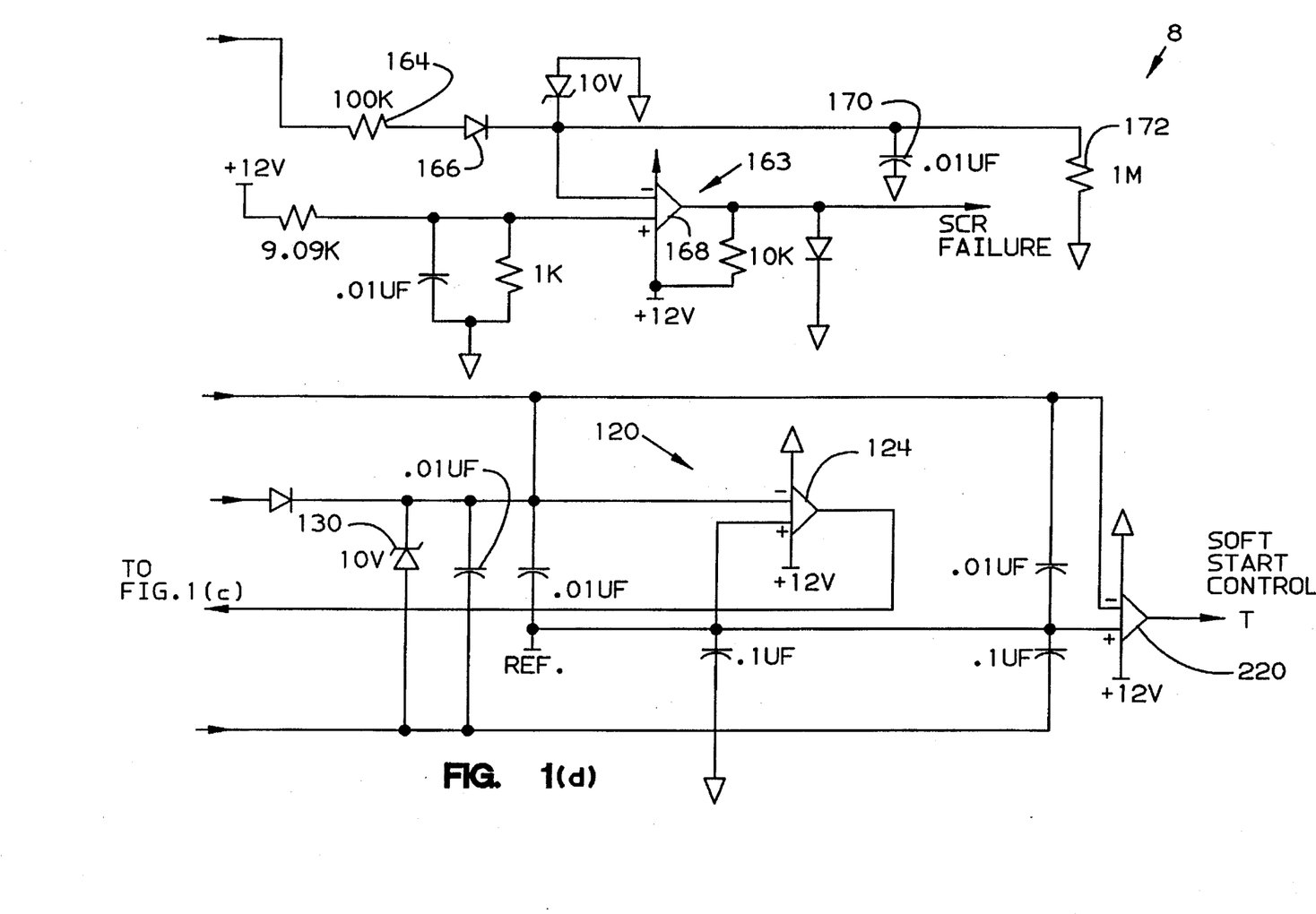
Figure 2:
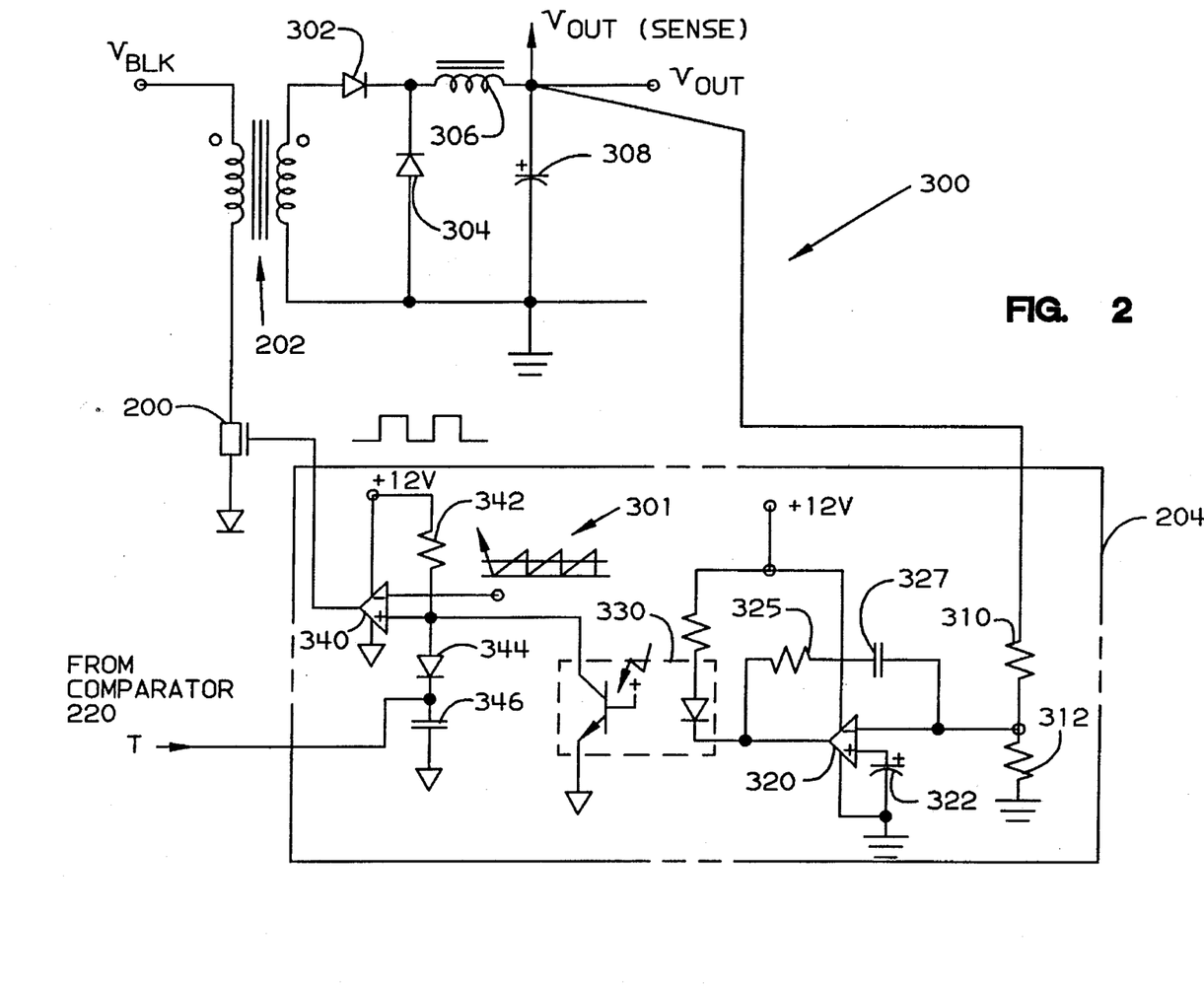
FIG. 2 is a circuit diagram of the DC/DC converter of FIG. 1(a).

The DC/DC section 10 is illustrated in more detail in FIG. 2 and comprises a power train 300 and a pulse width modulator 204. The power train 300 comprises a high frequency isolating transformer 202, rectifiers 302 and 304, a series inductor 306 and a parallel capacitor 308. The (full wave rectified) bulk voltage is applied across transformer 202, rectified by diodes 302 and 304 and then low pass filtered by inductor 306 and capacitor 308. The pulse width modulator 204 controls a duty cycle of a switch 200 to regulate the amount of power transferred across transformer 202 and therefore, the magnitude of the output voltage, Vout.

The pulse width modulator 204 operates by sensing Vout using voltage dividing resistors 310 and 312. The divided voltage is applied to an inverting input of an operational amplifier 320, the noninverting input being supplied by a DC reference voltage 322 (which can itself be a divided voltage from a DC source). A feedback resistor 325 and 327 providing a smoothing effect. The difference output of the amplifier 320 is applied to an input LED of an optocoupler 330. The output of the optocoupler 330, formed by a photosensitive transistor to ground, is applied to a noninverting input of a comparator 340. This noninverting input is also supplied with current from a twelve volt source via a resistor 342, and drained from a series diode 344 and capacitor 346. Thus, the output section of the optocoupler 330 is in parallel with the diode 344 and capacitor 346, and the degree to which the optocoupler is turned-on by amplifier 320 determines the voltage at the noninverting input of comparator 340. The inverting input of comparator 340 is supplied with a sawtooth waveform. The output of comparator 340 controls a switch 200 which determines the duty cycle of transformer 202.

When Vout is higher than ideal, this will substantially lower the output of amplifier 320, which will substantially turn on optocoupler 330 and substantially lower the voltage at the noninverting input of comparator 340. Consequently, the duty cycle of comparator 340 will be low because the saw tooth will quickly exceed the reference voltage at the noninverting input during each cycle. The low duty cycle will decrease the amount of power transferred across transformer 202 and thereby lower the output voltage Vout to a more ideal level. The converse is also true. If Vout is too low, the output of amplifier 320 will be higher and turn on optocoupler 330 to a lesser extent. Consequently, the reference voltage at the noninverting input of comparator 340 will be higher and yield a greater duty cycle for switch 200.

The following circuitry provides a soft start signal to the DC/DC converter 10 for use immediately after a lightning surge ends. As described above, in the event of lightning or other surge (that for example, raise the bulk voltage to 400 volts or greater), comparator 154 goes high. This turns on transistor 159 which turns on clamping transistor 157 and causes the output of comparator 220 to go low. This will discharge capacitor 346. Thus, the reference voltage at the noninverting input of comparator 340 will be clamped to a very low level, the duty cycle of switch 200 will be very low and the power train of the DC/DC converter will receive very little power. This is desirable under these surge conditions. When the surge dissipates, the voltage across capacitor 40 will fall below 400 volts (or another set threshold) and the output of comparator 154 will go low. This will cause the clamping transistor 157 to turn on, and the output of comparator 220 to exhibit a high impedance state. The soft start capacitor 346 will then charge gradually, according to the resistor 342/capacitor 346 time constant. The resultant gradual rise of the reference voltage at the noninverting input of comparator 340 will gradually increase (1) the duty cycle of switch 200, (2) the power drawn by the power train, (3) the power dissipated in switch 200 and (4) the output voltage. This will prevent damage to switch 200.

Figure 3:
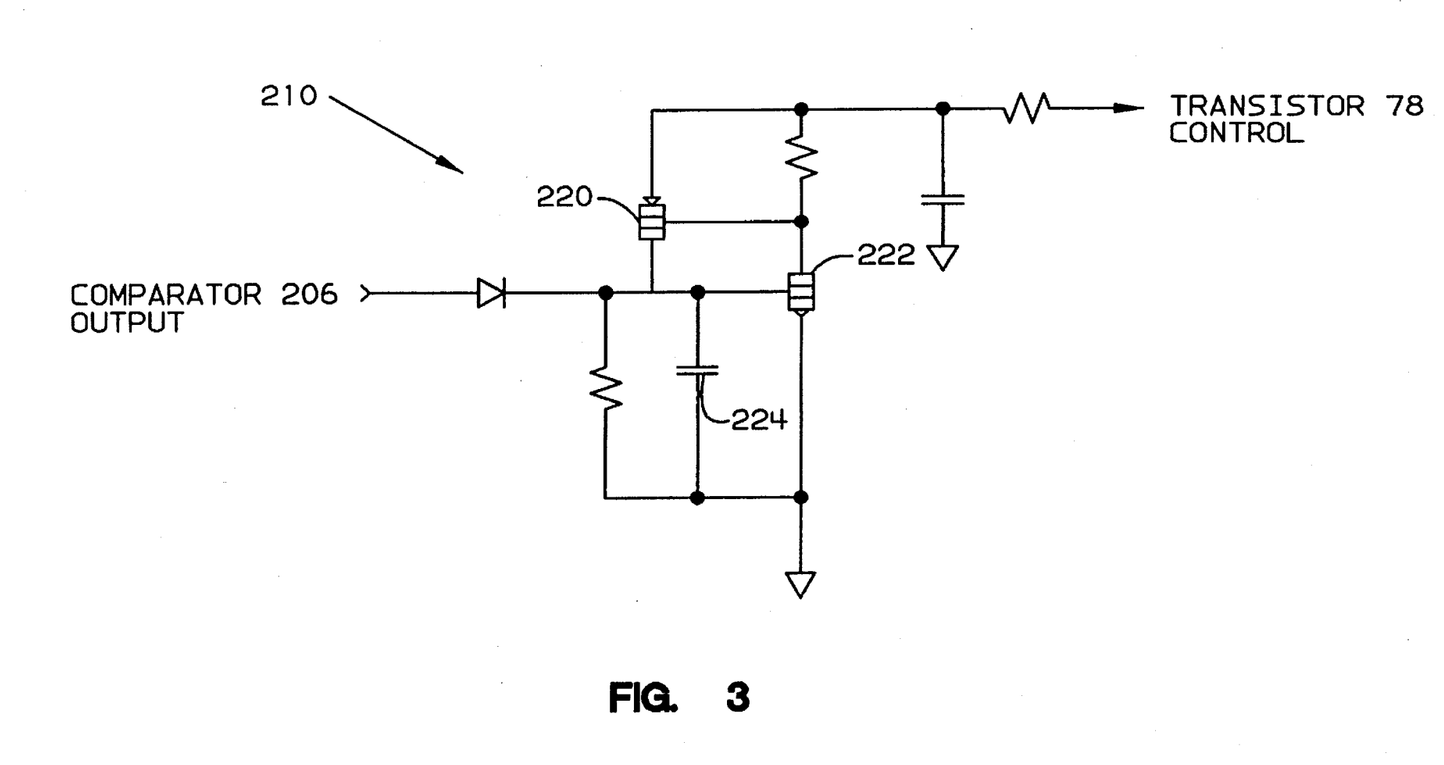
FIG. 3 is a detailed circuit diagram of a latch within the input rectifying and filtering circuit of FIG. 1(b).

Circuit 20 also includes a subcircuit 200 to prevent excessive inrush current if all three phases of input power are absent for more than twenty five milliseconds. One reason this is important is that during this period, capacitor 92 will substantially discharge. If the power resumes but to less than all three phases, then subcircuit 54 may attempt to active SCR 90 bringing capacitor 92 in parallel with capacitor 40. If SCR 90 were activated then, this would dramatically increase the inrush current which is undesirable. Subcircuit 200 operates as follows. When all three phases of input power are absent, the output of comparator 56 will remain low for the duration and apply this low level signal to the inverting input of a comparator 204. Comparator 204 will then output a high level to the noninverting input of a comparator 206 after charging a capacitor 207 which takes 25 milliseconds. The resultant high level output of comparator 206 (after the 25 millisecond charging time of capacitor 207) will set a latch 210. The set latch 210 will turn off transistor 78 and SCR 90 so that capacitor 92 cannot be connected in parallel with capacitor 40. The latch 210 is illustrated in more detail in FIG. 3 and comprises two complimentary transistors 220 and 222 and a holding capacitor 224. Latch 210 will be reset after power returns and capacitor 207 discharges.

Circuit 20 also includes a subcircuit 160 to indicate if SCR 90 fails in the short circuit mode. In such a case, the AC/DC converter will still be supplied with operating power except the power factor will be reduced which is undesirable. Subcircuit 160 operates as follows. The voltage at the anode of SCR 90 is supplied via a resistor 164 and a diode 166 to the inverting input of a comparator 168. A capacitor 170 and a resistor 172 with a large RC time constant are connected in parallel with each other and to the cathode of diode 166 so that the capacitor 170 stores the anode voltage (after being reduced 10% by the series resistor 164). The noninverting input of comparator 168 is supplied with a reference voltage. When the SCR 90 is functional and all three phases are present, a rectified ripple voltage exists at the anode of SCR 90 due to the resistor 95 and parallel diode 174. The rectified ripple voltage is enough to keep the capacitor 170 charged above the reference voltage. This causes comparator 168 to output a low level which indicates that the SCR has not failed in the short circuit mode. Likewise, when the SCR 90 is functional and one phase is absent, capacitor 170 maintains enough charge to exceed the reference voltage. However, if the SCR 90 shorts, the anode voltage will fall to less than one volt peak and the capacitor 170 discharges below the reference voltage. This will cause comparator 168 to output a high level which indicates failure of SCR 90.

Circuit 20 also includes a subcircuit 102 to prevent the SCR 90 from being activated until a few milliseconds after the twelve volt bias voltage is present. This is important upon power-on and if the bias voltage is lost for other reasons. Subcircuit 102 comprises a comparator 106 whose noninverting input is supplied by a parallel RC circuit 108. The inverting input is supplied by a positive reference voltage. Upon power-on, the capacitor in the RC circuit 108 will gradually charge to the reference voltage. Until charging to the reference voltage, the comparator 106 will output a low level which keeps both transistor 78 and SCR 90 off. After the charging time, for example, a few milliseconds, comparator 106 will output a constant high level but this will not activate transistor 78 unless comparator 76 (and the other controls) also output high levels.

Based on the foregoing, a circuit which permits a three phase input power supply to operate when one phase drops out, and provides protection from lightning has been disclosed. However, numerous modifications and substitutions can be made without deviating from the scope of the present invention. Therefore, the invention has been disclosed by way of illustration and not limitation, and reference should be made to the following claims to determine the scope of the present invention.

We claim:

1. A power converter comprising:

a plurality of rectifiers for rectifying a three phase power source;

a DC/DC converter coupled to receive power from the rectified three phases;

a first capacitor coupled to said converter to filter and store the rectified three phases;

a switch;

a second capacitor connected in series with said switch and coupled to said DC/DC converter;

means, responsive to absence of one of said phases, for activating said switch to connect said second capacitor in parallel with said DC/DC converter to filter and store the rectified two phases; and means for preventing said switch from activating when a forward voltage across said switch exceeds a predetermined reference voltage to prevent surge current through said switch even though one of said phases becomes absent.

2. A power converter as set forth in claim 1 wherein said switch is deactivated when all three phases are present whereby said second capacitor does not substantially filter or store the rectified three phases.

3. A power converter as set forth in claim 1 further comprising means for deactivating said switch during power-on.

4. A power converter as set forth in claim 1 wherein the switch and second capacitor series forms a circuit between said DC/DC converter and ground, said circuit not having substantial resistance in a direction of subsequent conduction of said switch when said switch is activated.

5. A power converter as set forth in claim 1 further comprising means, responsive to absence of all three phases, for activating said switch thereby connecting said second capacitor in parallel with said DC/DC converter to supply energy stored in said second capacitor to said DC/DC converter.

6. A power converter as set forth in claim 1 further comprising means, responsive to excess voltage provided by at least one of said phases, for activating said switch thereby connecting said second capacitor in parallel with said DC/DC converter.

7. A power converter as set forth in claim 1 wherein said switch is an SCR.

8. A power converter as set forth in claim 1 further comprising means for soft starting said DC/DC converter after a lightning surge dissipates.

9. A power converter as set forth in claim 1 wherein the switch and said second capacitor series is connected in parallel with said first capacitor.

10. A power converter comprising:

a plurality of rectifiers for rectifying a three phase power source;

a first capacitor coupled to filter and store the rectified three phases to yield a voltage supply with a substantial DC component;

a switch;

a second capacitor connected in series with said switch and coupled to said voltage supply;

means, responsive to excess voltage provided by at least one of said phases, for activating said switch to stabilize said voltage supply; and means for preventing said switch from activating when a forward voltage across said switch exceeds a predetermined reference voltage to prevent surge current through said switch even though excess voltage is provided by at least one of said phases.

11. A power converter as set forth in claim 10 wherein said switch is an SCR.

12. A power converter as set forth in claim 10 further comprising a DC/DC converter connected to said voltage supply.

13. A method for producing a voltage supply with a substantial DC component, said method comprising the steps of:

receiving and rectifying an AC power source;

filtering and storing energy of the rectified source to produce said voltage supply; and detecting loss or partial loss of the received AC power source and monitoring a forward voltage across a switch, and in response to the detected loss, activating said switch to connect a second capacitor to said voltage supply to stabilize said voltage source if the forward switch voltage is less than a predetermined level.

14. A power converter as set forth in claim 13 further comprising means for soft starting said DC/DC converter after a lightning surge dissipates.

15. A power converter comprising:

a voltage supply derived from an AC input and comprising a substantial DC component;

a switch;

a capacitor connected in series with said switch, a circuit comprising the capacitor and switch series being connected between said supply and ground, said circuit not having substantial resistance in a direction of subsequent conduction of said switch when said switch is activated;

means, responsive to loss or partial loss of said AC input, for activating said switch; and means for preventing said switch from activating when a voltage across said switch in said direction of subsequent conduction exceeds a predetermined reference voltage despite loss or partial loss of said AC input.

16. A power converter as set forth in claim 15 wherein said AC input is three phase and said partial loss is loss of one phase of said AC input.

17. A power converter as set forth in claim 16 further comprising a DC/DC converter connected between said voltage supply and ground.

18. A power converter as set forth in claim 16 further comprising means for rectifying said three phases into said voltage supply.

19. A power converter as set forth in claim 15 wherein said switch is an SCR and said direction of subsequent conduction is from an anode to cathode of said SCR.

* * * * *